(12) United States Patent
Xing et al.

(10) Patent No.: US 10,370,826 B2
(45) Date of Patent: Aug. 6, 2019

(54) SYSTEM AND METHOD FOR REDUCING FUEL CONSUMPTION OF A WORK VEHICLE

(71) Applicant: CNH Industrial America, LLC, New Holland, PA (US)

(72) Inventors: Yun Xing, Willowbrook, IL (US); Troy Bateman, Channahon, IL (US)

(73) Assignee: CNH Industrial America LLC, New Holland, PA (US)

( * ) Notice: Subject to any disclaimer, the term of this patent is extended or adjusted under 35 U.S.C. 154(b) by 148 days.

(21) Appl. No.: 15/453,267

(22) Filed: Mar. 8, 2017

(65) Prior Publication Data

US 2018/0258615 A1    Sep. 13, 2018

(51) Int. Cl.
*E02F 9/22* (2006.01)
*E02F 3/34* (2006.01)
(Continued)

(52) U.S. Cl.
CPC .......... *E02F 9/2246* (2013.01); *B60W 10/04* (2013.01); *B60W 10/115* (2013.01); (Continued)

(58) Field of Classification Search
CPC .... F02F 9/2246; B60W 10/04; B60W 10/115; B60W 10/30; B60W 30/1886; B60W 2300/17; B60W 2510/0638; B60W 2510/1035; B60W 2510/12; B60W 2510/305; B60W 2710/0644; B60W 2710/1033; B60W 2710/12; B60W 2710/305; E02F 3/34; E02F 9/2066; E02F 9/2079; E02F 9/2235; E02F 9/2253; F02D 41/021; F02D 41/26; F02D 41/3005; F15B 11/08; F15B 2211/20553; F15B 2211/275
See application file for complete search history.

(56) References Cited

U.S. PATENT DOCUMENTS 5,999,872 A   12/1999   Kinugawa et al.
6,819,996 B2  11/2004   Graves et al.
(Continued)

FOREIGN PATENT DOCUMENTS

EP   0423353 A1   4/1991
EP   0884422 A2   12/1998
(Continued)

OTHER PUBLICATIONS

European Search Report for European Application No. 18160227.7, dated Jul. 18, 2018 (5 pages).

*Primary Examiner* — Thomas G Black
*Assistant Examiner* — Sze-Hon Kong
(74) *Attorney, Agent, or Firm* — Peter K. Zacharias; Patrick M. Sheldrake

(57) ABSTRACT

A method for reducing fuel consumption of a work vehicle may include monitoring one or more loads associated with both a drive power requirement and a hydraulic power requirement for the work vehicle. In addition, the method may include actively adjusting one or more operating parameters of the work vehicle based on the monitored loads in a manner that meets the drive power requirement and the hydraulic power requirement for the work vehicle while reducing the fuel consumption of the vehicle's engine.

17 Claims, 5 Drawing Sheets

(51) Int. Cl.
- *B60W 10/04* (2006.01)
- *B60W 10/115* (2012.01)
- *B60W 10/30* (2006.01)
- *B60W 30/188* (2012.01)
- *E02F 9/20* (2006.01)
- *F02D 41/02* (2006.01)
- *F02D 41/26* (2006.01)
- *F02D 41/30* (2006.01)
- *F15B 11/08* (2006.01)

(52) U.S. Cl.
CPC ........ *B60W 10/30* (2013.01); *B60W 30/1886* (2013.01); *E02F 3/34* (2013.01); *E02F 9/2066* (2013.01); *E02F 9/2079* (2013.01); *E02F 9/2235* (2013.01); *E02F 9/2253* (2013.01); *F02D 41/021* (2013.01); *F02D 41/26* (2013.01); *F02D 41/3005* (2013.01); *F15B 11/08* (2013.01); *B60W 2300/17* (2013.01); *B60W 2510/0638* (2013.01); *B60W 2510/1035* (2013.01); *B60W 2510/12* (2013.01); *B60W 2510/305* (2013.01); *B60W 2710/0644* (2013.01); *B60W 2710/1033* (2013.01); *B60W 2710/12* (2013.01); *B60W 2710/305* (2013.01); *F15B 2211/20553* (2013.01); *F15B 2211/275* (2013.01)

(56) References Cited

U.S. PATENT DOCUMENTS

| | | | |
|---|---|---|---|
| 7,264,571 | B2 | 9/2007 | Englisch et al. |
| 7,493,978 | B2 | 2/2009 | Nakamura et al. |
| 7,959,538 | B2 | 6/2011 | Hatanaka |
| 8,463,509 | B2 | 6/2013 | Saito |
| 8,818,664 | B2 | 8/2014 | Lado et al. |
| 8,954,242 | B2 | 2/2015 | Miyasaka |
| 8,983,741 | B2 | 3/2015 | Park et al. |
| 2011/0196585 | A1* | 8/2011 | Ishibashi ................ E02F 9/202 701/51 |
| 2013/0218428 | A1* | 8/2013 | Onodera ............... F16H 61/421 701/54 |
| 2013/0325293 | A1* | 12/2013 | Jacobson ............... E02F 9/2246 701/103 |
| 2015/0307077 | A1* | 10/2015 | Xing ..................... B60W 10/06 701/50 |
| 2016/0251827 | A1* | 9/2016 | Ge ........................ B60W 30/18 701/50 |
| 2016/0347321 | A1* | 12/2016 | Ge ........................ E02F 9/2246 |
| 2017/0037964 | A1* | 2/2017 | Barngrover ........... F16H 61/433 |
| 2017/0130428 | A1* | 5/2017 | Matsuzaki ................ E02F 9/20 |
| 2018/0252314 | A1* | 9/2018 | Hyodo ..................... F01P 5/04 |

FOREIGN PATENT DOCUMENTS

| | | |
|---|---|---|
| EP | 1676962 A2 | 7/2006 |
| WO | 2007097665 A1 | 8/2007 |

* cited by examiner

SYSTEM AND METHOD FOR REDUCING FUEL CONSUMPTION OF A WORK VEHICLE

FIELD OF THE INVENTION

The present subject matter relates generally to work vehicles and, more particularly, to a system and method for reducing the fuel consumption of a work vehicle that includes a lift assembly for the adjusting the position of an associated implement.

BACKGROUND OF THE INVENTION

Work vehicles having a lift assembly, such as wheel loaders, skid steer loaders, telescopic handlers, wheel loaders, backhoe loaders, compact track loaders and the like, are a mainstay of construction work and industry. In addition to including various hydraulic system components associated with operating the lift assembly (e.g., hydraulic pumps, control valves, and associated cylinders), such work vehicles often include a continuously variable transmission having both a planetary gear unit and a hydrostatic drive unit to allow the vehicle to operate in both a hydrostatic mode and a hydro-mechanical mode.

Typically, for a work vehicle such as a wheel loader, the primary power consumers of engine power are the hydraulic system components used for operating the lift assembly and the drivetrain components for transferring power from the engine to the vehicle's wheels. However, to date, current vehicle control systems have failed to take into account both of these primary power consumers when attempting to optimize the operating efficiency of the work vehicle. As a result, current work vehicles often operate at a less than optimal fuel efficiency, particularly during work cycles that require operation of both the lift assembly and the drive system.

Accordingly, an improved system and method for reducing the fuel consumption of a work vehicle having a lift assembly would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for reducing fuel consumption of a work vehicle, wherein the work vehicle includes an engine that drives both a continuously variable transmission and a first hydraulic pump associated with a lift assembly of the work vehicle. The method may generally include monitoring, by one or more computing devices, a pressure differential of a hydrostatic drive unit of the continuously variable transmission, wherein the pressure differential is associated with a drive power requirement for driving the work vehicle. The method may also include monitoring, by the one or more computing devices, a discharge pressure of the first hydraulic pump, wherein the discharge pressure is associated with a hydraulic power requirement for operating the lift assembly and the hydraulic and drive power requirements collectively define a total system power requirement for the work vehicle. In addition, the method may include determining, by the one or more computing devices, an input value that will minimize a fuel consumption function of the work vehicle based at least in part on the monitored pressure differential and the monitored discharge pressure, wherein the fuel consumption function relates fuel consumption for the engine to the total system power requirement. Moreover, the method may include determining, by the one or more computing devices, a new engine speed value for the engine and a new swash plate angle value for the first hydraulic pump based on the input value and the fuel consumption function, and actively adjusting, by one or more computing devices, the operation of the engine to the new engine speed value. Further, the method may include actively adjusting, by the one or more computing devices, the operation of the first hydraulic pump such that a first swash plate of the first hydraulic pump is moved to the new swash plate angle.

In another aspect, the present subject matter is directed to a system for reducing fuel consumption of a work vehicle. The system may include an engine and a continuously variable transmission rotationally coupled to the engine. The continuously variable transmission may include a hydrostatic drive unit. The system may also include a lift assembly having a first hydraulic pump rotationally driven by the engine. Additionally, the system may include a controller configured to control the operation of the engine, the continuously variable transmission, and the first hydraulic pump. The controller may include a processor and associated memory. The memory may store instructions that, when implemented by the processor, configure the controller to monitor a pressure differential within the hydrostatic drive unit and monitor a discharge pressure of the first hydraulic pump, wherein the pressure differential is associated with a drive power requirement for driving the work vehicle and the discharge pressure is associated with a hydraulic power requirement for operating the lift assembly. The hydraulic power requirement and the drive power requirement may collectively define a total system power requirement for the work vehicle. In addition, the controller may be configured to determine an input value that will minimize a fuel consumption function of the work vehicle based at least in part on the monitored pressure differential and the monitored discharge pressure, wherein the fuel consumption function relates fuel consumption for the engine to the total system power requirement. Moreover, the controller may be configured to determine a new engine speed value for the engine and a new swash plate angle value for the first hydraulic pump based on the input value and the fuel consumption function.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
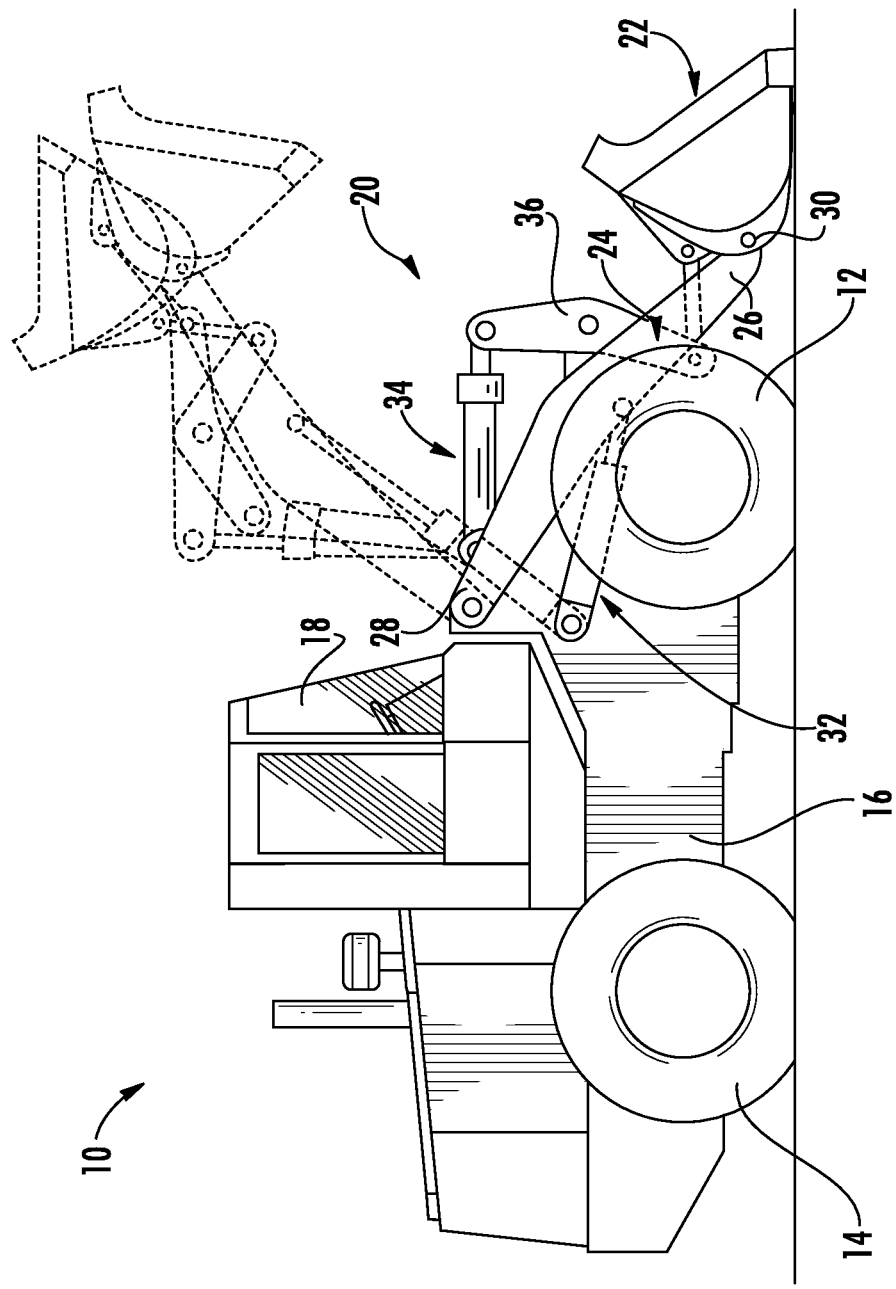
FIG. 1 illustrates a side view of one embodiment of a work vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for reducing the fuel consumption of a work vehicle. Specifically, in several embodiments, a controller of the disclosed system may be configured to monitor one or more loads associated with a system power requirement for the work vehicle. As will be described below, the system power requirement may be defined as a function of both a drive power requirement associated with driving the work vehicle and a hydraulic power requirement for operating a lift assembly of the work vehicle. Based on the monitored loads, the controller may be configured to intelligently adjust one or more operating parameters of the work vehicle in a manner that meets the drive power requirement and the hydraulic power requirement for the work vehicle while reducing the overall fuel consumption of the vehicle's engine.

Referring now to the drawings, FIG. 1 illustrates a side view of one embodiment of a work vehicle 10 in accordance with aspects of the present subject matter. As shown, the work vehicle 10 is configured as a wheel loader. However, in other embodiments, the work vehicle 10 may be configured as any other suitable work vehicle that includes a lift assembly for adjusting the position of an associated implement, such as a skid steer loader, a backhoe loaders, a compact track loaders and/or the like.

As shown, the work vehicle 10 includes a pair of front wheels 12, (one of which is shown), a pair of rear wheels 14 (one of which is shown) and a frame or chassis 16 coupled to and supported by the wheels 12, 14. An operator's cab 18 may be supported by a portion of the chassis 16 and may house various input devices for permitting an operator to control the operation of the work vehicle 10. As will be described below with reference to FIG. 2, the work vehicle 10 may also include a drivetrain 102 for delivering engine power to the wheels 12, 14 for driving the vehicle 10.

Moreover, as shown in FIG. 1, the work vehicle 10 may include a lift assembly 20 for raising and lowering a suitable implement 22 (e.g., a bucket) relative to a driving surface of the vehicle 10. In several embodiments, the lift assembly 20 may include a pair of loader arms 24 (one of which is shown) pivotally coupled between the chassis 16 and the implement 22. For example, as shown in FIG. 1, each loader arm 24 may include a forward end 26 and an aft end 28, with the forward end 26 being pivotally coupled to the implement 22 at a forward pivot point 30 and the aft end 28 being pivotally coupled to a portion of the chassis 16.

In addition, the lift assembly 20 may also include a pair of hydraulic lift cylinders 32 (one of which is shown) coupled between the chassis 16 and the loader arms 24 and a tilt cylinder 34 coupled between the chassis 16 and the implement 22 (e.g., via a pivotally mounted bellcrank 36 or other mechanical linkage). It should be readily understood by those of ordinary skill in the art that the lift and tilt cylinders 32, 34 may be utilized to allow the implement 22 to be raised/lowered and/or pivoted relative to the driving surface of the work vehicle 10. For example, the lift cylinders 32 may be extended and retracted in order to pivot the loader arms 24 upward and downwards, respectively, thereby at least partially controlling the vertical positioning of the implement 22 relative to the driving surface. Similarly, the tilt cylinder 34 may be extended and retracted in order to pivot the implement 22 relative to the loader arms 36 about the forward pivot point 30, thereby controlling the tilt angle or orientation of the implement 22 relative to the driving surface.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Figure 2:
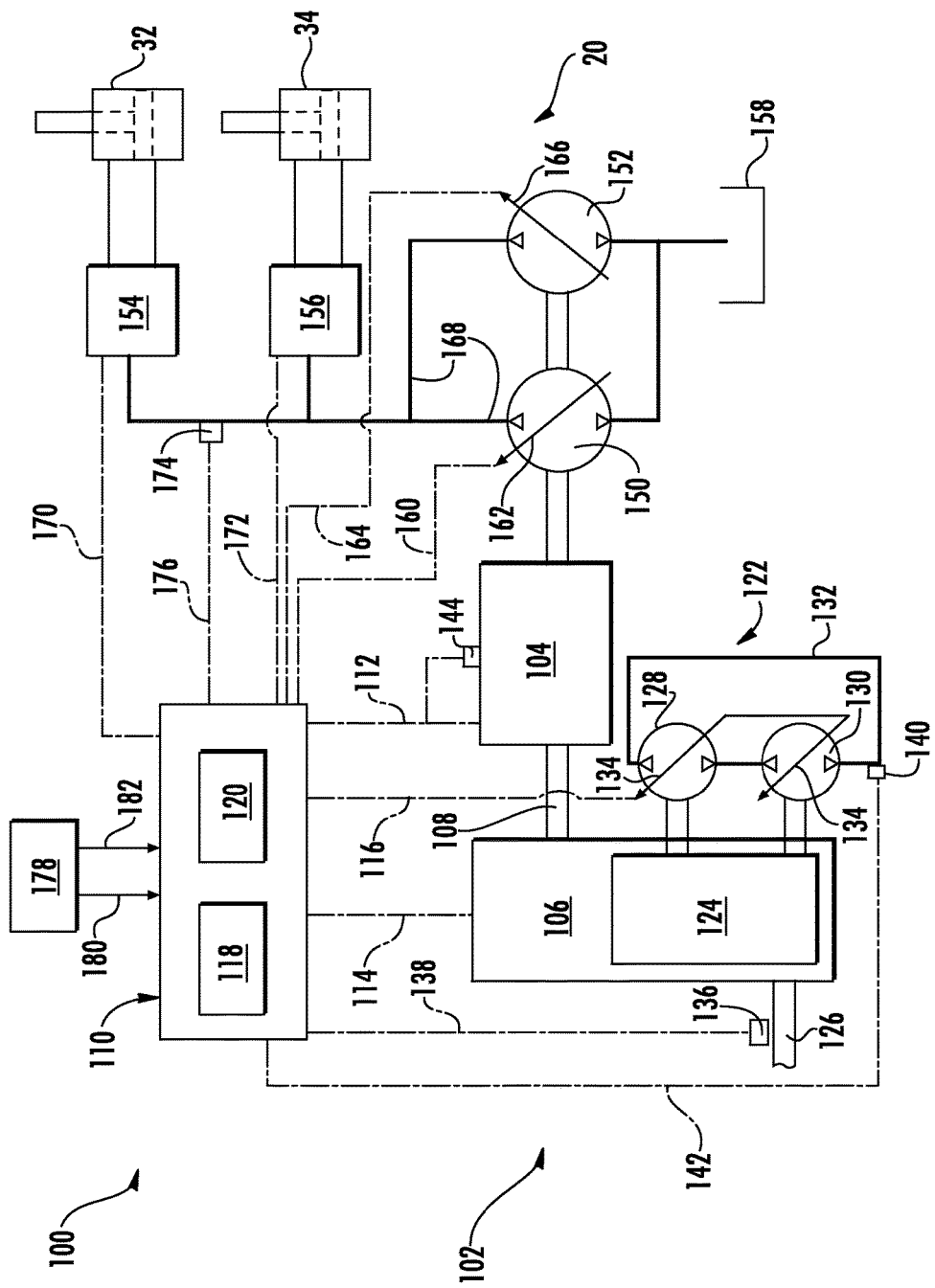
FIG. 2 illustrates one embodiment of a system for reducing the fuel consumption of a work vehicle in accordance with aspects of the present subject matter.

Referring now to FIG. 2, a schematic, simplified view of one embodiment of a system 100 for reducing the fuel consumption of a work vehicle is illustrated in accordance with aspects of the present subject matter. In general, the system 100 will be described herein with reference to the work vehicle 10 shown in FIG. 1. However, it should be appreciated that the disclosed system 100 may be utilized with any other suitable work vehicles to allow for an increase in their fuel efficiency. It should be appreciated that hydraulic or fluid couplings of the system 100 shown in FIG. 2 are indicated by bold lines. Similarly, communicative links or electrical couplings of the system 100 shown in FIG. 2 are indicated by phantom lines.

As shown in FIG. 2, in several embodiments, the system 100 may include one or more components of a drivetrain 102 for transferring engine power to the front and/or rear wheels 12, 14 for driving the work vehicle 10. In several embodiments, the drivetrain 102 may generally include an engine 104 and a continuously variable transmission (CVT) 106 configured to be mounted on the chassis 16 (FIG. 1) of the work vehicle 10. In one embodiment, the transmission 106 may be operably coupled to the engine 104 via one or more output shafts 108.

In addition, the system 100 may include a controller 110 configured to control the operation of one or more components of the work vehicle 10, such as the engine 104 and the transmission 106. For example, the controller 110 may be communicatively coupled to one or more components of the engine 104 (e.g., an engine governor or engine control unit (ECU) (not shown)) via one or more communicative links 112 in order to control and/or monitor the speed and/or torque output of the engine 104. Similarly, the controller 110 may be communicatively coupled to one or more transmission components via one or more communicative links 114, 116 to control the operation of the transmission 106. For instance, the controller 110 may be configured to transmit suitable current commands via communicative link 114 to one or more clutch valves (not shown) to control the engagement/disengagement of one or more clutches (not shown) of the transmission 106.

It should be appreciated the controller 110 may generally comprise any suitable processor-based device known in the art, such as one or more computing devices. Thus, in several embodiments, the controller 110 may include one or more processor(s) 118 and associated memory device(s) 120 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 120 of the controller 110 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 110 may generally be configured to store suitable computer-readable instructions that, when implemented by the processor(s) 118, configure the controller 110 to perform various computer-implemented functions, such as performing the various calculations described herein and/or implementing the flow diagram described below with reference to FIG. 5. In addition, the controller 110 may also include various other suitable components, such as a communications circuit or module, one or more input/output channels, a data/control bus and/or the like.

It should also be appreciated that the controller 110 may correspond to an existing controller of the work vehicle 10 (e.g., an existing engine and/or transmission controller) or the controller 110 may correspond to a separate controller. For instance, in one embodiment, the controller 110 may form all or part of a separate plug-in module that may be installed within the work vehicle 10 to allow for the disclosed system and method to be implemented without requiring additional software to be uploaded onto existing control devices of the vehicle 10.

As is generally understood, when the transmission 106 corresponds to a CVT, the transmission 106 may include both a hydrostatic drive unit 122 and a planetary gear unit 124 configured to be driven by the engine 104 via one or more shafts and associated gears. In such an embodiment, the transmission 106 may be operated in either a hydrostatic mode or a hydro-mechanical mode, with rotary output from the planetary gear unit 124 being transferred to an output shaft 126 of the transmission 106 and then to the front and/or rear wheels 12, 14 (e.g., via one or more axle assemblies) for driving the work vehicle 10. As shown in FIG. 2, the hydrostatic drive unit 122 may generally include a hydraulic pump 128 coupled by fluid conduits 132 in a closed fluid loop to a corresponding hydraulic motor 130. In one embodiment, the hydraulic pump 128 may generally correspond to any suitable electronically controlled pump known in the art, such as an electronically controlled variable displacement hydraulic pump. Similarly, in one embodiment, the hydraulic motor 130 may generally correspond to any suitable electronically controlled motor known in the art, such as an electronically controlled variable displacement hydraulic motor. The swash plate controls of the pump 128 and the motor 130 are coupled mechanically or electronically. As such, the operation of the hydrostatic drive unit 122 may be automatically controlled by the system controller 110. For example, as shown in FIG. 2, the controller 110 may be communicatively coupled to the hydrostatic drive unit 122 via communicative link 116 so that the angle of corresponding swash plates of the hydrostatic drive unit 122 (the swash plates being denoted by diagonal arrows 134 through the pump 128 and the motor 130) may be adjusted through a range of positions, thereby adjusting the transmission ratio of the transmission 106. For instance, the angle of the swash plates 134 may be adjust via an actuator(s) (not shown) configured to be controlled by the controller 110.

It should be appreciated that the controller 110 may be communicatively coupled to one or more sensors for monitoring one or more corresponding operational parameters of the vehicle's drivetrain 102. For instance, as shown in FIG. 2, the controller 110 may be communicatively coupled to one or more speed sensors 136 (e.g., via communicative link 138) configured directly or indirectly detect the output speed of the transmission 106, thereby allowing the controller 110 to continuously monitor the transmission output speed via feedback from the sensor(s) 136. Moreover, as shown in FIG. 2, the controller 110 may be communicatively coupled to one or more pressure sensors 140 (e.g., via communicative link 142) configured to directly or indirectly detect the fluid pressure within the closed fluid loop of the hydrostatic drive unit 122, thereby allowing the controller 110 to continuously monitor the pressure differential of the fluid circulating within the loop. In addition, the controller 110 may be communicatively coupled to one or more engine sensors 144 configured to directly or indirectly detect the engine speed and the engine torque, thereby allowing the controller 110 to continuously monitor the operational parameters of the engine 104.

Moreover, the controller 110 may also be communicatively coupled to one or more components for controlling the operation of the various cylinders 32, 34 (FIG. 1) of the lift assembly 20 of the work vehicle 10. For example, in several embodiments, the controller 110 may be coupled to one or more hydraulic pumps 150, 152 and associated control valves 154, 156 for controlling the flow of hydraulic fluid from a fluid tank 158 of the work vehicle 10 to each cylinder 32, 34. Specifically, as shown in FIG. 2, the lift assembly 20 may include a first hydraulic pump 150 and a second hydraulic pump 152, with both pumps 150, 152 being driven via an output of the engine 104. In such an embodiment, the controller 110 may be communicatively coupled to the first hydraulic pump 150 (e.g., via communicative link 160) so that the angle of a first swash plate of the first hydraulic pump 150 (the swash plate being denoted by diagonal arrow 162 through the pump 150) may be automatically adjusted to regulate the discharge flow of the pump 150. Similarly, the controller 110 may be communicatively coupled to the second hydraulic pump 152 (e.g., via communicative link 164) so that the angle of a second swash plate of the second hydraulic pump 152 (the swash plate being denoted by diagonal arrow 166 through the pump 152) may be automatically adjusted to regulate the discharge flow of the pump 152. In one embodiment, the angle of each swash plate 162, 166 may be adjusted via an associated actuator(s) (not shown) configured to be controlled by the controller 110.

As shown in FIG. 2, the hydraulic pumps 150, 152 may be fluidly coupled to one or more lift control valves 154 and one or more tilt control valves 156 via one or more fluid lines 168. The lift control valve(s) 154 may generally be configured to regulate the supply of hydraulic fluid to each lift cylinder 32, thereby controlling the extension/retraction of the lift cylinders 32. Similarly, the tilt control valve(s) 156 may generally be configured to regulate the supply of hydraulic fluid to the tilt cylinder 34, thereby controlling the extension/retraction of the tilt cylinder 34. In several embodiments, the control valves 154, 156 may correspond to electrically controlled valves (e.g., solenoid-activated valves) to allow the controller 110 to automatically control the operation of each valve 154, 156. For instance, as shown in FIG. 2, the controller 110 may be communicatively coupled to the control valves 154, 156 via associated communicative links 170, 172, thereby allowing the controller 110 to regulate the extension/retraction of the associated cylinders 32, 34 via control of the valves 154, 156.

It should be appreciated that the controller 110 may also be communicatively coupled to one or more sensors for monitoring one or more corresponding operational parameters of the vehicle's lift assembly 20. For instance, as shown in FIG. 2, the controller 110 may be communicatively coupled to one or more pressure sensors 174 (e.g., via communicative link 176) configured directly or indirectly detect the pressure of the hydraulic fluid supplied to the control valves 154, 156. As such, the controller 110 may continuously monitor the discharge pressure of the pumps 150, 152.

It should also be appreciated that the controller 110 may be configured to receive one or more inputs from various input devices 178 of the work vehicle 10. For instance, in several embodiments, the controller 110 may be configured to receive operator-selected inputs from one or more input devices 178 housed within the cab 18 of the work vehicle 10. Specifically, in one embodiment, the controller 110 may be configured to receive an operator-selected ground speed input associated with a desired ground speed for the work vehicle 10 (e.g., as indicated by arrow 180 in FIG. 2). In such an embodiment, the controller 110 may be configured to control the operation of the engine 104 and/or the transmission 106 to ensure that the desired ground speed is achieved. Similarly, in one embodiment, the controller 110 may be configured to receive an operator-selected lift assembly input associated with adjusting the position of the loader arms 24 and/or the implement 22. In such an embodiment, the controller 110 may, for example, be configured to control the operation of the hydraulic pumps 150, 152 to ensure that a minimum flow requirement is delivered to the control valves 154, 156 to allow for the desired movement of the loaders arms 24 and/or the implement 22.

As indicated above, the primary power consumers of a work vehicle 10 having a lift assembly 20 are typically the drive system components of the drivetrain 102 and the hydraulic system components of the lift assembly 20. For example, the overall system power requirement for the work vehicle 10 may be generally expressed according the following equation (Equation 1):

$$P_{sys}=P_{drive}+P_{hyd} \quad (1)$$

wherein, $P_{sys}$ corresponds to the total system power requirement, $P_{drive}$ corresponds to the drive power requirement for achieving the desired ground speed of the work vehicle 10, and $P_{hyd}$ corresponds to the hydraulic power requirement for achieving the flow demand needed to operate the lift assembly 20 as commanded.

In several embodiments, the controller 110 of the disclosed system 110 may be configured to monitor one or more of the loads within the drive system components and the hydraulic system components (e.g., the pressure differential within the fluid loop of the hydrostatic drive unit 122 and the discharge pressure of the pumps 150, 152) to determine the total power required ($P_{sys}$) to perform the current work operation requested for the work vehicle 10. Based on the sensed loads and the system power requirement, the controller 110 may be configured to actively adjust various operating parameters of the work vehicle 10 in a manner that ensures that the drive power requirement and the hydraulic power requirement for the work vehicle 10 are met while reducing the overall fuel consumption of the engine 104.

Drive Power Requirement

As indicated above, the drive power requirement for the work vehicle 10 may generally vary as a function of the requested or demanded ground speed of the work vehicle (e.g., as determined via ground speed input 180). In this regard, the requested or demanded ground speed may be expressed as a function of the transmission output speed required to provide such ground speed. For instance, the output speed for the transmission 106 may be expressed according to the following equation (Equation 2):

$$n_0 = \frac{v_{grd}}{r_{tire} * r_{df}} \quad (2)$$

wherein, $n_0$ corresponds to the transmission output speed, $v_{grd}$ corresponds to the desired ground speed of the work vehicle 10, $r_{tire}$ corresponds to the radius of the vehicle's tires, and $r_{df}$ corresponds to the overall gear ratio from the output shaft 126 of the transmission 106 to the wheels 12, 14.

Additionally, the transmission output speed may also be defined as a function of the engine speed and the swash plate angle of the hydrostatic drive unit 122. For instance, in addition to Equation 2, the transmission output speed may also be expressed according to the following equation (Equation 3):

$$n_0 = f_1(n_e, \gamma) \quad (3)$$

wherein, $n_e$ corresponds to the engine speed, and $\gamma$ corresponds to the swash plate angle of the swash plate 134 of the hydrostatic drive unit 122.

In several embodiments, the drive power requirement may be defined as a function of the power loss of the hydrostatic drive unit 122 of the transmission 106, the parasitic power loss of the transmission 106, and the load power needed to drive the work vehicle 10 at the requested speed. For instance, the drive power requirement may be expressed according to the following equations (Equations 4 and 5), with Equation 5 representing the functions defining each power input for Equation 4:

$$P_{grd}=\Delta P_{hcvt}+\Delta P_{para}+P_{load} \quad (4)$$

$$P_{grd}=f_2(n_e,n_o,\Delta p,\gamma)+f_3(n_e,n_o)+f_4(\Delta p,g,n_0) \quad (5)$$

wherein, $P_{grd}$ corresponds to the drive power requirement, $\Delta P_{hcvt}$ corresponds to the power loss of the hydrostatic drive unit 122, $\Delta P_{para}$ corresponds to the parasitic power loss of the transmission 106, $P_{load}$ corresponds to the load power, $n_e$ corresponds to the engine speed, $\Delta p$ corresponds to the pressure differential within the fluid loop of the hydrostatic drive unit 122, $\gamma$ corresponds to the swash plate angle of the hydrostatic drive unit 122, and g corresponds to the engaged range clutch of the transmission 106.

It should be appreciated that, in several embodiments, the specific relationships associated with the functions (e.g., $f_2(n_e, n_o, \Delta p, \gamma)$, $f_3(n_e, n_o)$, $f_4(\Delta g, g, n_0)$) used in Equation 5 to define the respective power input values of Equation 4 (e.g., $\Delta P_{hcvt}$, $\Delta P_{para}$, $P_{load}$) may be stored within the controller's memory 120 to allow the controller 110 to calculate the drive power requirement. For instance, in one embodiment, the controller 110 may include one or more efficiency tables stored within its memory 120 that allow the controller 110 to determine the power loss of the hydrostatic drive unit 122 of the transmission 106, the parasitic power loss of the transmission 106, and the load power based on the inputs associated with each corresponding function.

Hydraulic Power Requirement in general, the hydraulic power requirement for the work vehicle 10 may vary as a function of the total flow requirement for operating the lift and tilt cylinders 32, 34, which, in turn, may be based on the inputs received by the controller 110 related to the desired movement for the loaders arms 24 and/or the implement 22 (e.g., lift assembly input 182 of FIG. 2). In several embodiments, the flow requirement for the lift assembly 20 may be expressed according to the following equation (Equation 6):

$$Q_{re} = Q_{tilt} + Q_{lift} \qquad (6)$$

wherein, $Q_{re}$ corresponds to the total flow requirement for the lift assembly 20, $Q_{tilt}$ corresponds to the flow requirement for the tilt cylinder 34, and $Q_{lift}$ corresponds to the flow requirement for the lift cylinders 32.

Based on the total flow requirement, the power needed to drive the hydraulic load (i.e., the lift and tilt cylinders 32, 34) may be determined. For instance, in one embodiment, the load power for the lift assembly 20 may be expressed according to the following equation (Equation 7):

$$P_{wr} = p_d * Q_{re} \qquad (7)$$

wherein, $P_{wr}$ corresponds to the load power for the lift assembly 20, and $p_d$ corresponds to the discharge pressure for the hydraulic pumps 150, 152.

Additionally, by knowing the load power requirement for the lift assembly 20, the total hydraulic power requirement for the system 100 may be determined by taking into account the efficiencies of the hydraulic pumps 150, 152. For instance, in one embodiment, the total hydraulic power requirement for the lift assembly 20 may be expressed according to the following equation (Equation 8):

$$P_{hyd} = \Delta p_{G1} + \Delta p_{G2} + P_{wr} = f_5(n_e, \gamma_1, p_d) + f_6(n_e, \gamma_2, p_d) + p_d * Q_{re} \qquad (8)$$

wherein, $P_{hyd}$ corresponds to the total hydraulic power requirement for the lift assembly 20, $\Delta p_{G1}$ corresponds to the power loss across the first pump 150, $\Delta p_{G2}$ corresponds to the power loss across the second pump 152, $\gamma_1$ corresponds to the swash plate angle of the first pump 150, and $\gamma_2$ corresponds to the swash plate angle of the second pump 152.

Figure 3:
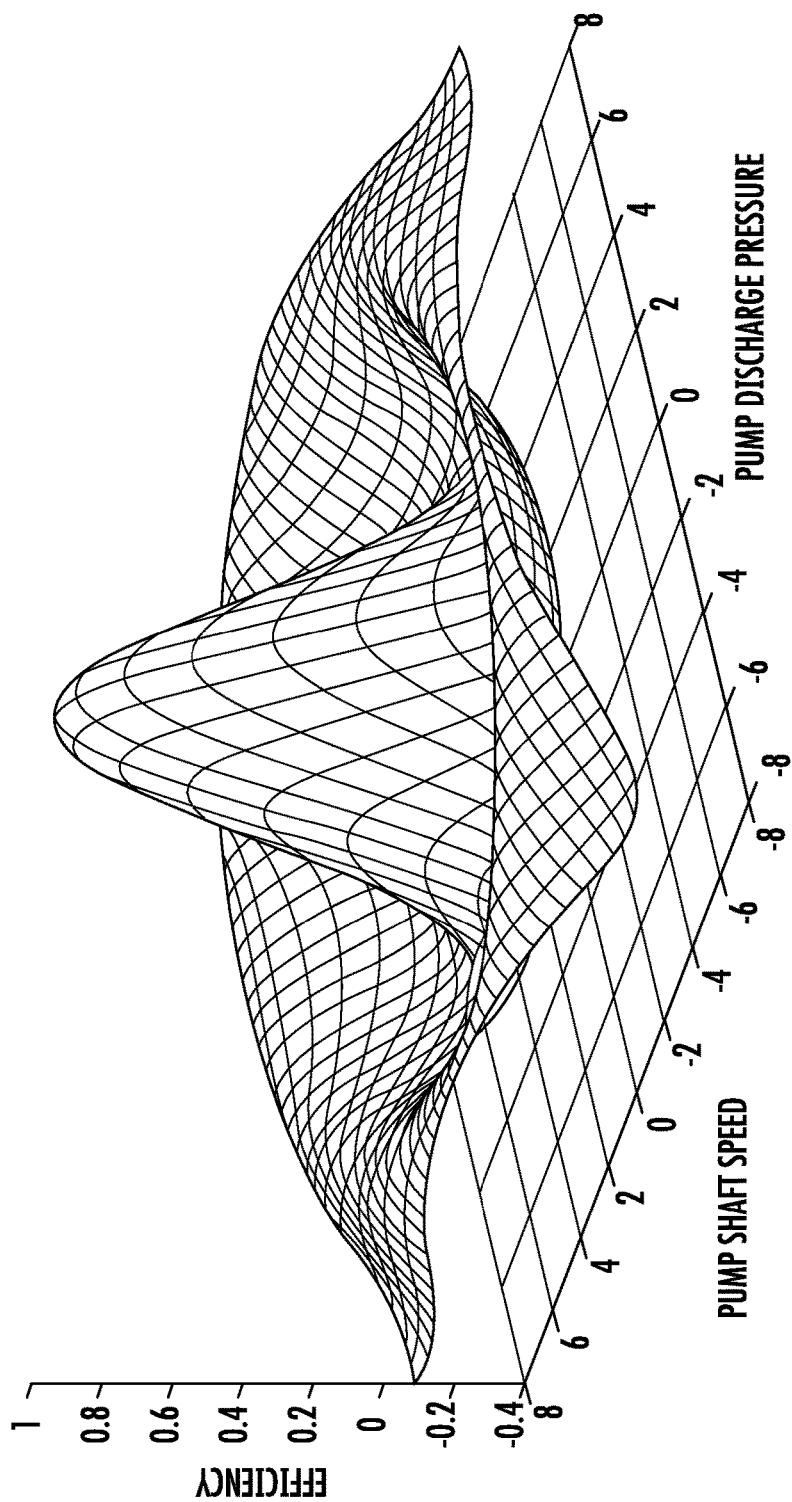
FIG. 3 illustrates a graphical representation of an example efficiency map for a hydraulic pump in accordance with aspects of the present subject matter.

It should be appreciated that, in several embodiments, the specific relationships associated with the functions (e.g., $f_5(n_e, \gamma_1, p_d)$, $f_6(n_e, \gamma_2, p_d)$) used in Equation 8 to define the respective power loss inputs for the pumps 150, 152 (e.g., $\Delta p_{G1}$ and $\Delta p_{G2}$) may be stored within the controller's memory 120 to allow the controller 110 to calculate such power loss values. Specifically, in one embodiment, the controller 110 may include one or more pump efficiency tables stored within its memory 120 that allow the controller 110 to determine the power loss values associated with the hydraulic pumps 150, 152 as a function of the discharge pressure, the engine speed, and the corresponding swash plate angles. For example, FIG. 3 illustrates a graphical representation of an example efficiency map for a hydraulic pump at a given swash plate angle. In such instance, the mathematical relationship associated with the pump efficiency map may be stored within the controller's memory 120 (e.g., as a lookup table) to allow the controller 110 to calculate the power losses associated with each pump 150, 152. It should be appreciated that the pump shaft speed shown in FIG. 3 may be directly correlated to the engine speed ($n_e$).

Additionally, it should be appreciated that the total flow requirement for the lift assembly 20 may also be defined as a function of the engine speed and the respective swash plate angles of the hydraulic pumps 150, 152. For instance, in one embodiment, the flow requirement for the lift assembly 20 may be expressed according to the following equation (Equation 9):

$$Q_{re} = n_e * (CC_{G1} * \gamma_1 + CC_{G2} * \gamma_2) \qquad (9)$$

wherein, $CC_{G1}$ corresponds to the maximum displacement of the first hydraulic pump 150 per revolution and $CC_{G2}$ corresponds to the maximum displacement of the second hydraulic pump 152 per revolution.

System Power Requirement and Fuel Consumption

As indicated above with reference to Equation 1, the total system power requirement for the work vehicle 10 may be defined as the summation of the drive power requirement and the hydraulic power requirement. Thus, combining Equations 1, 5, and 8, the system power requirement may be expressed according to the following equation (Equation 10):

$$P_{sys} = f_2(n_e, n_o, \Delta p, \gamma) + f_3(n_e, n_o) + f_4(\Delta p, g, n_0) + f_5(n_e, \gamma_1, p_d) + f_6(n_e, \gamma_2, p_d) + p_d * Q_{re} \qquad (10)$$

Figure 4:
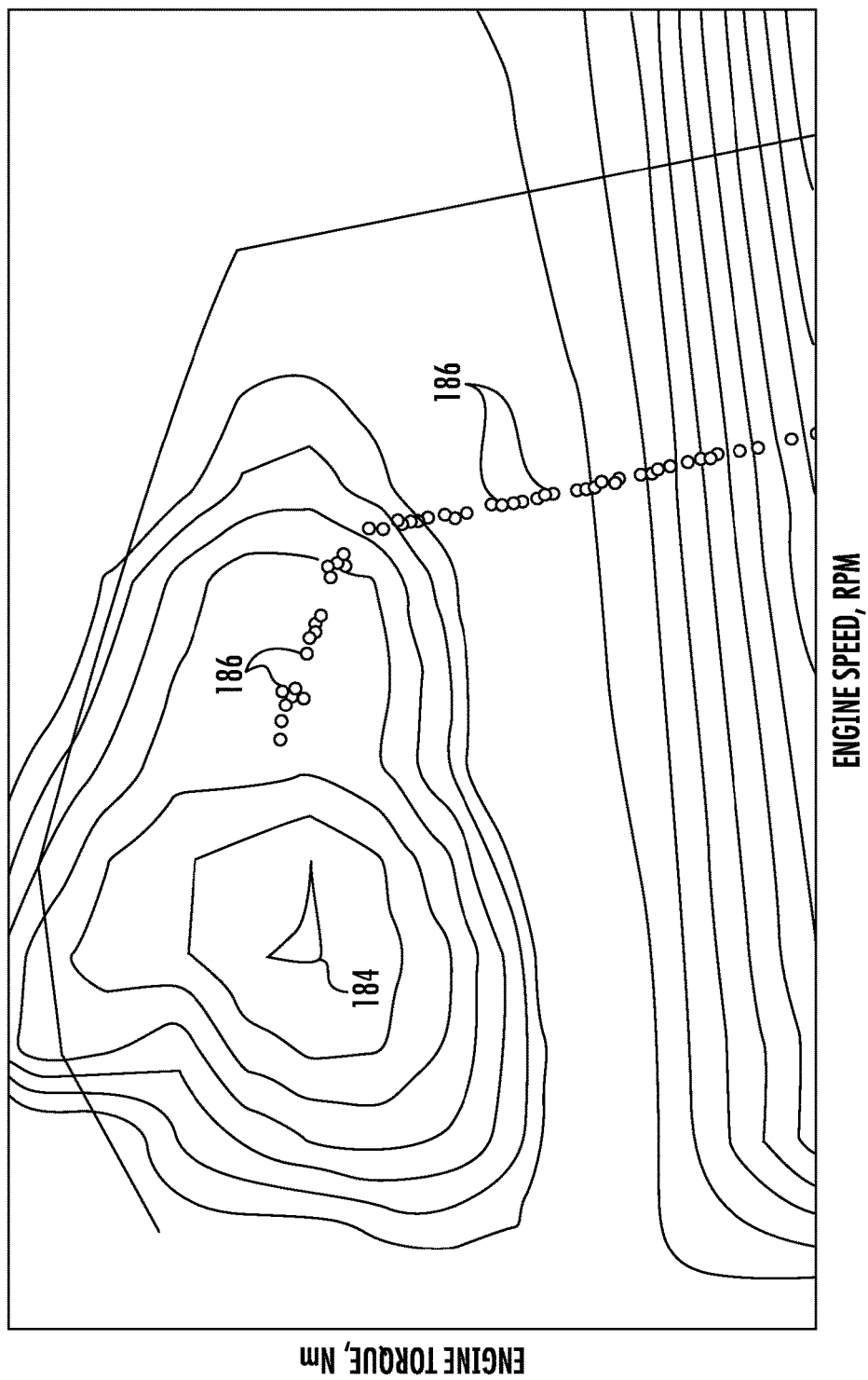
FIG. 4 illustrates an example engine fuel efficiency map in accordance with aspects of the present subject matter.

In general, the fuel consumption of the engine 104 may be defined as a function of both engine speed and engine torque. For instance, FIG. 4 illustrates an example engine fuel efficiency map. As shown, a central "eye" or area 184 of the fuel efficiency map may represent the most fuel efficient engine operation, with the various identified operating points 186 corresponding to differing engine speed/torque pairs associated with different fuel consumption values. Based on the fuel efficiency map, the fuel consumption may be expressed as a bilinear interpolated polynomial of engine speed and engine torque according to the following equation (Equation 11):

$$fc = c_1 * n_e + c_2 * T_e + c_3 * n_e * T_e + c_4 \qquad (11)$$

wherein, fc corresponds to fuel consumption of the engine 104, $T_e$ corresponds to the engine torque, and $c_1, c_2, c_3, c_4$ correspond to specific constants applied depending on the position of the current operating point of the engine 104 on the fuel efficiency map.

Moreover, given that the system power requirement from Equation 10 is supplied by the engine 104, the engine torque can be expressed as a function of both the system power requirement and the engine speed, such as according to the following equations (Equations 12 and 13), with Equation 13 substituting Equation 10 for the system power requirement:

$$T_e = \frac{P_{sys}}{n_e} \qquad (12)$$

-continued $$T_e = \frac{f_2(n_e, n_o, \Delta p, \gamma) + f_3(n_e, n_o) + f_4(\Delta p, g, n_0) + f_5(n_e, \gamma_1, p_d) + f_6(n_e, \gamma_2, p_d) + p_d * Q_{re}}{n_e} \quad (13)$$

By utilizing many of the above equations, the fuel consumption for the engine 104 may be defined as a function of several operating parameters of the work vehicle 10. For instance, by solving Equation 3 for the swash plate angle ($\gamma$) of the hydrostatic drive unit 122 and Equation 9 for the swash plate angle ($\gamma_2$) of the second hydraulic pump 152 and by plugging the results into Equations 11 and 13, the fuel consumption for the engine 104 may be expressed according to the following equation (Equation 14):

$$fc = f_7(n_e, \gamma_1, n_o, Q_{re}, p_d, \Delta p) \quad (14)$$

As indicated above, the output speed of the transmission ($n_o$) and the flow requirement ($Q_{re}$) correspond to system settings (e.g., by being defined as a function of operator inputs 180, 182) while the discharge pressure ($p_d$) for the pumps 150, 152 and the pressure differential ($\Delta p$) for the hydrostatic drive unit 122 correspond to monitored parameters (e.g., via sensors 140, 174). As a result, since the only independent control variables are the engine speed ($n_e$) and the swash plate angle ($\gamma_1$) of the first hydraulic pump 150, Equation 14 can be simplified to the following equation (Equation 15):

$$fc = f_7(n_e, \gamma_1) \quad (15)$$

It should be appreciated, as an alternative to the swash plate angle ($\gamma_1$) of the first hydraulic pump 150, the fuel consumption function may also be defined as a function of the engine speed ($n_e$) and the swash plate angle ($\gamma_2$) of the second hydraulic pump 152. Specifically, as opposed to solving Equation 9 for the swash plate angle ($\gamma_2$) of the second hydraulic pump 152, the equation may be solved for the swash plate angle ($\gamma_1$) of the first hydraulic pump 150 such that the engine speed ($n_e$) and the swash plate angle ($\gamma_2$) of the second hydraulic pump 152 correspond to the two independent control variables.

In accordance with aspects of the present subject matter, since the fuel consumption function ($f_7(n_e, \gamma_1)$) of Equation 15 is defined as a function of the system power requirement, the fuel consumption function may be utilized within an optimization algorithm to determine the operating parameters at which the fuel consumption is minimized or reduced while still ensuring that both the drive power requirement and the hydraulic power requirement for the vehicle 10 are satisfied. For instance, in one embodiment, a gradient analysis may be performed to minimize the fuel consumption function. Specifically, the gradient of the fuel consumption function may be expressed according to the following equation (Equation 16):

$$\nabla f_7 = \frac{\partial f_7}{\partial n_e} i + \frac{\partial f_7}{\partial \gamma_1} j \quad (16)$$

Using the above-defined relationship, a scalar input value (t>0) may be determined along the direction of the negative gradient of the fuel consumption function ($-\nabla f_7$) that will minimize the function and, thus, the fuel consumption of the engine 104. For instance, in one embodiment, the input value may be determined according to the following equation (Equation 17):

$$\nabla f_7(n_e - t*\nabla f_7(n_e, \gamma_1)i, \gamma_1 - t*\nabla f_7(n_e, \gamma_1)*\nabla f_7(n_e, \gamma_1) \quad (17)$$

wherein, t corresponds to the input value.

By solving equation 17 for the scalar input value (t), such input value along with the fuel consumption function, may be utilized to determine new or updated values for the independent control variables (e.g., the engine speed and the swash plate angle of the first hydraulic pump 150) that allow the system 100 to meet the vehicle's drive and hydraulic power requirements while reducing fuel consumption of the engine 104. For instance, the new values for the independent control variables may be calculated according to the following equations (Equations 18 and 19):

$$(n_e)' = n_e - t*\nabla f_{7i} \quad (18)$$

$$(\gamma_1)' = \gamma_1 - t*\nabla f_{7j} \quad (19)$$

wherein, $(n_e)'$ corresponds to the new engine speed value, $(\gamma_1)'$ corresponds to the new swash plate angle for the first hydraulic pump 150, $n_e$ corresponds to the current engine speed value, and $\gamma_1$ corresponds to the current swash plate angle for the first hydraulic pump 150.

Once the new engine speed value and the new swash plate angle have been determined, such new parameters may then be utilized to determine new or updated values for the system's other control variables (i.e., the swash plate angle for the hydrostatic drive unit 122 and the swash plate angle for the second hydraulic pump 152). For instance, a new swash plate angle for the hydrostatic drive unit 122 may be calculated as a function of the new engine speed value ($(n_e)'$) by inputting such value into Equation 3. Similarly, a new swash plate angle for the second hydraulic pump 152 may be calculated as a function of the new engine speed value ($(n_e)'$) and the new swash plate angle ($(\gamma_1)'$) for the first hydraulic pump 150 by inputting such values into the Equation 9. Similar to the other control variables (e.g., engine speed and the swash plate angle of the first hydraulic pump 150), the newly calculated swash plate angles for the hydrostatic drive unit 122 and the second hydraulic pump 152 may allow the system 100 to meet the vehicle's drive and hydraulic power requirements while reducing fuel consumption of the engine 104.

Figure 5:
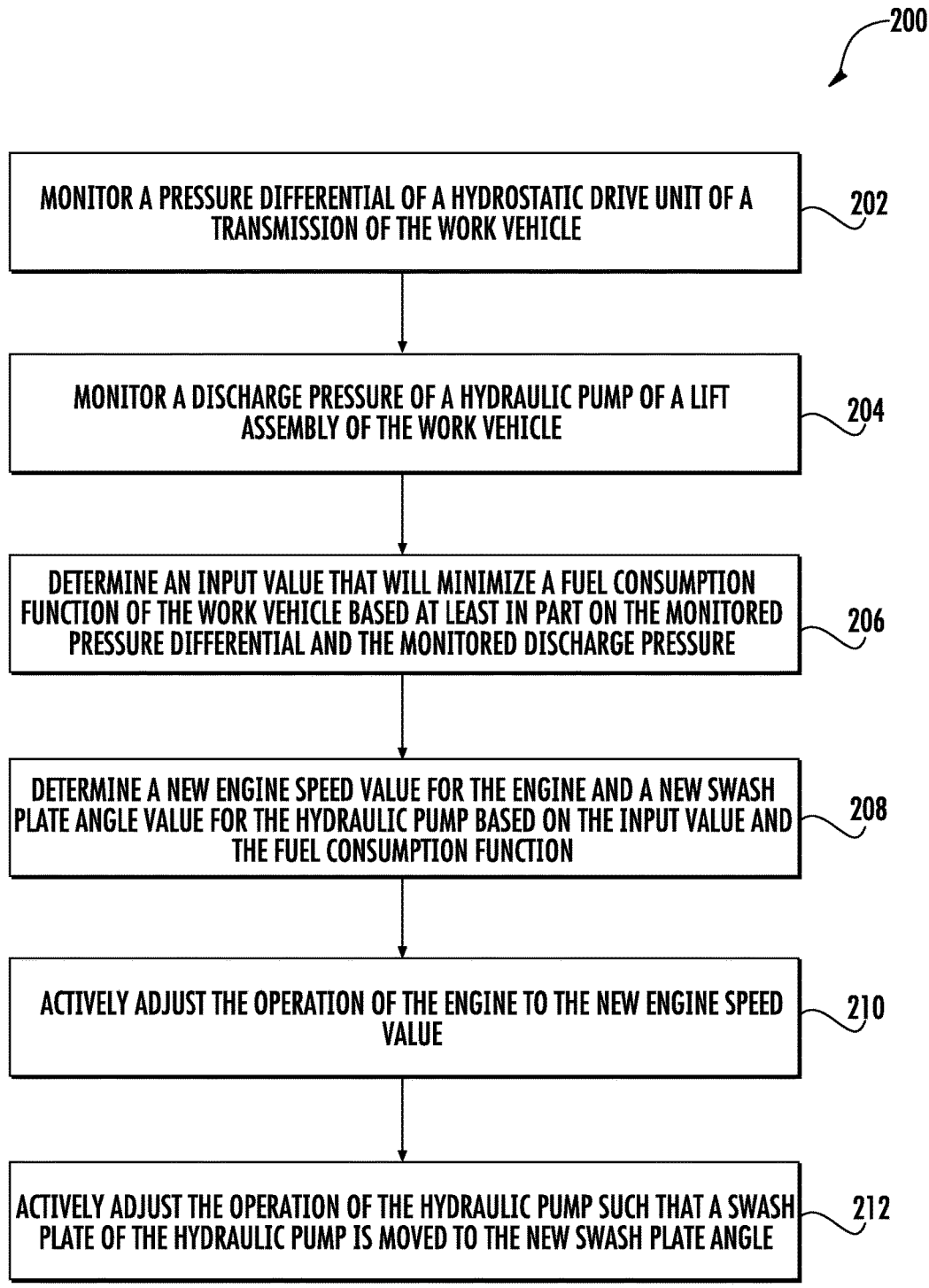
FIG. 5 illustrates a flow diagram of one embodiment of a method for reducing the fuel consumption of a work vehicle in accordance with aspects of the present subject matter.

Referring now to FIG. 5, a flow diagram of one embodiment of a method 200 for reducing the fuel consumption of a work vehicle is illustrated in accordance with aspects of the present subject matter. In general, the method 200 will be described herein with reference to the work vehicle 10 shown in FIG. 1, as well as the various system components shown in FIG. 2. However, it should be appreciated that the disclosed method 200 may be implemented with work vehicles having any other suitable configuration and/or within systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include monitoring a pressure differential within a hydrostatic drive unit of a transmission of the work vehicle. For instance, as indicated above, the controller 110 may be communicatively coupled to one or more pressure sensors 140 configured to directly or indirectly detect the pressure differential within fluid loop of the hydrostatic drive unit 122. As provided above with reference to Equation 5, the pressure differential of the hydrostatic drive unit 122 may be associated with the drive power requirement for driving the work vehicle 10.

Additionally, at (204), the method 200 may include monitoring a discharge pressure of a hydraulic pump of a lift assembly of the work vehicle. For instance, as indicated above, the controller 110 may be communicatively coupled to one or more pressure sensors 174 configured to directly or indirectly detect the discharge pressure of the hydraulic pump(s) 150, 152. As provided above with reference to Equation 8, the discharge pressure of the hydraulic pump(s) 150, 152 may be associated with the hydraulic power requirement for operating the lift assembly 20.

Moreover, at (206), the method 200 may include determining an input value that will minimize a fuel consumption function of the work vehicle based at least in part on the monitored pressure differential and the monitored discharged pressure. For instance, as indicated above with reference to Equation 14, the fuel consumption function may be defined as a function of various operating parameters, such as the discharge pressure ($p_d$) for the hydraulic pumps 150, 152, the pressure differential ($\Delta p$) for the hydrostatic drive unit 122, the output speed ($n_o$) of the transmission 106, the flow requirement for the lift assembly 20, the engine speed ($n_e$), and the swash plate angle ($\gamma_1$) of the first hydraulic pump 150. Moreover, as described above with reference to Equations 15-17, an optimization algorithm (e.g., a gradient analysis) may be applied to determine a scalar input value (t) that minimizes the fuel consumption function.

Referring still to FIG. 5, at (208), the method 200 may include determining a new engine speed value for the engine and a new swash plate angle value for the hydraulic pump based on the input value and the fuel consumption function. For instance, as indicated above, Equations 18 and 19 may be utilized by the controller 110 to calculate the new or updated values for the independent control variables of the fuel consumption function. Moreover, the new values for the engine speed and the swash plate angle may also be utilized to calculate updated or new values for the other control variables of the system 100 (e.g., the swash plate angle of the hydrostatic drive unit 122 and the swash plate angle for the other hydraulic pump of the lift assembly 20).

In addition, at (210) and (212), the method 200 may include actively adjusting the operation of the engine to the new engine speed value and actively adjusting the operation of the hydraulic pump such that a swash plate of the hydraulic pump is moved to the new swash plate angle. Specifically, once the new values for the independent control variables are determined, the controller 110 may be configured to actively adjust the operation of the engine 106 and the hydraulic pump so that such components are operating at the newly calculated values. Similarly, the controller 110 may also be configured to actively adjust the operation of the hydrostatic drive unit 122 and the other hydraulic pump based on the new swash plate angles determined for the components. Accordingly, the controller 110 may be configured to adjust the operation of the work vehicle 10 in a manner that allows the vehicle's drive and hydraulic power requirements to be met while reducing the fuel consumption for the engine 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing fuel consumption of a work vehicle, the work vehicle including an engine driving both a continuously variable transmission and a first hydraulic pump associated with a lift assembly of the work vehicle, the method comprising:
   monitoring, by one or more computing devices, a pressure differential of a hydrostatic drive unit of the continuously variable transmission, the pressure differential being associated with a drive power requirement for driving the work vehicle;
   monitoring, by the one or more computing devices, a discharge pressure of the first hydraulic pump, the discharge pressure being associated with a hydraulic power requirement for operating the lift assembly, the hydraulic power requirement and the drive power requirement defining a total system power requirement for the work vehicle;
   analyzing, by the one or more computing devices, a fuel consumption function of the work vehicle based on at least the monitored pressure differential and the monitored discharge pressure to determine an input value that will minimize the fuel consumption function, the fuel consumption function relating fuel consumption for the engine to the total system power requirement;
   determining, by the one or more computing devices, a new engine speed value for the engine and a new swash plate angle value for the first hydraulic pump as a function of the input value and the fuel consumption function;
   actively adjusting, by the one or more computing devices, the operation of the engine to the new engine speed value; and
   actively adjusting, by the one or more computing devices, the operation of the first hydraulic pump such that a first swash plate of the first hydraulic pump is moved to the new swash plate angle.

2. The method of claim 1, wherein the drive power requirement is determined as a function of a power loss of the hydrostatic drive unit and a parasitic power loss of the continuously variable transmission.

3. The method of claim 1, wherein the hydraulic power requirement is defined as a function of a power loss across the first hydraulic pump and a flow requirement for delivering hydraulic fluid to a lift cylinder and a tilt cylinder of the lift assembly.

4. The method of claim 1, wherein the lift assembly further includes a second hydraulic pump, the method further comprising:
   determining a new second swash plate angle for the second hydraulic pump as a function of the new engine speed value for the engine and the new swash plate angle for the first hydraulic pump; and
   actively adjusting the operation of the second hydraulic pump such that a second swash plate of the second hydraulic pump is moved to the new second swash plate angle.

5. The method of claim 1, further comprising:
   determining a new hydrostatic swash plate angle for the hydrostatic drive unit as a function of the new engine speed value for the engine; and actively adjusting the operation of the hydrostatic drive unit such that a swash plate of the hydrostatic drive unit is moved to the new hydrostatic swash plate angle.

6. The method of claim 1, further comprising determining at least one of the drive power requirement or the hydraulic power requirement using at least one efficiency table stored within memory of the one or more computing devices.

7. The method of claim 1, wherein determining the input value that will minimize the fuel consumption function of the work vehicle comprises applying a gradient analysis to the fuel consumption function to determine the input value.

8. The method of claim 1, wherein the work vehicle corresponds to a wheel loader.

9. A system for reducing fuel consumption of a work vehicle, the system comprising:
   an engine;
   a continuously variable transmission rotationally coupled to the engine, the continuously variable transmission including a hydrostatic drive unit;
   a lift assembly including a first hydraulic pump rotationally driven by the engine;
   a controller configured to control the operation of the engine, the continuously variable transmission, and the first hydraulic pump, the controller including a processor and associated memory, the memory storing instructions that, when implemented by the processor, configure the controller to:
   monitor a pressure differential of the hydrostatic drive unit, the pressure differential being associated with a drive power requirement for driving the work vehicle;
   monitor a discharge pressure of the first hydraulic pump, the discharge pressure being associated with a hydraulic power requirement for operating the lift assembly, the hydraulic power requirement and the drive power requirement defining a total system power requirement for the work vehicle;
   analyze a fuel consumption function of the work vehicle based on at least the monitored pressure differential and the monitored discharge pressure to determine an input value that will minimize the fuel consumption function, the fuel consumption function relating fuel consumption for the engine to the total system power requirement; and
   determine a new engine speed value for the engine and a new swash plate angle value for the first hydraulic pump as a function of the input value and the fuel consumption function.

10. The system of claim 9, wherein the controller is further configured to actively adjust the operation of the engine to the new engine speed value and actively adjust the operation of the first hydraulic pump such that a first swash plate of the first hydraulic pump is moved to the new swash plate angle.

11. The system of claim 9, wherein the drive power requirement is determined as a function of a power loss of the hydrostatic drive unit and a parasitic power loss of the continuously variable transmission.

12. The system of claim 9, wherein the hydraulic power requirement is defined as a function of a power loss across the first hydraulic pump and a flow requirement for delivering hydraulic fluid to a lift cylinder and a tilt cylinder of the lift assembly.

13. The system of claim 9, wherein the lift assembly further includes a second hydraulic pump, the controller being further configured to determine a new second swash plate angle for the second hydraulic pump as a function of the new engine speed value for the engine and the new swash plate angle for the first hydraulic pump and actively adjust the operation of the second hydraulic pump such that a second swash plate of the second hydraulic pump is moved to the new second swash plate angle.

14. The system of claim 9, wherein the controller is configured to determine a new hydrostatic swash plate angle for the hydrostatic drive unit as a function of the new engine speed value for the engine and actively adjust the operation of the hydrostatic drive unit such that a swash plate of the hydrostatic drive unit is moved to the new hydrostatic swash plate angle.

15. The system of claim 9, wherein the controller is further configured to determine at least one of the drive power requirement or the hydraulic power requirement using at least one efficiency table stored within memory of the controller.

16. The system of claim 9, wherein the controller is configured to apply a gradient analysis to the fuel consumption function to determine the input value.

17. The system of claim 9, wherein the work vehicle corresponds to a wheel loader.

* * * * *